Patented Aug. 24, 1937

2,090,846

UNITED STATES PATENT OFFICE 2,090,846

SOLDERING FLUX

Herbert E. Lawson, Freeport, Ill., assignor to Burgess Battery Company, Freeport, Ill., a corporation of Wisconsin No Drawing. Application October 26, 1936, Serial No. 107,673

14 Claims. (Cl. 148—25)

This invention relates to soldering fluxes, and in particular to a fluxing agent efficient in joining together any metals which may ordinarily be soldered and which may be used with a large variety of solder compositions.

The principal object of this invention is to provide a fluxing agent which is non-corrosive at ordinary temperatures and which is very active at soldering temperatures. Other objects are to provide a flux of the water insoluble type which is effective in the soldering of metals that do not readily respond to this type of flux, such as zinc, iron and steel; to provide a flux which will form a non-corrosive protective coating on the soldered joint after the soldering operation has been completed; and to provide a fluxing agent which is readily adaptable to convenient use in a variety of soldering processes.

Soldering fluxes at present available may be divided into two classes; namely, those which are water soluble and those which are water insoluble. The water soluble flux is generally a mineral acid such as hydrochloric or phosphoric acid, or salts of an acid nature ionizable to form an acid upon hydrolysis. This type of flux is very active, is corrosive at ordinary temperatures, and is generally injurious to the human skin or the vapors arising therefrom are irritating or poisonous when taken into the human body. Any residue remaining after the soldering operation has been completed must be carefully removed to prevent corrosion. Fluxes of the water insoluble type, however, are generally non-corrosive at ordinary temperatures so that any residue left on the metallic parts cause no damage. These fluxes are not entirely satisfactory in certain cases because the weak acids which comprise the active ingredients are not sufficiently quick-acting nor do they clean the parts to be soldered as thoroughly as do the water soluble fluxes.

I have discovered a new type of fluxing agent whose activity at soldering temperatures is comparable to that of water soluble fluxes, but which is non-corrosive at ordinary temperatures either before or after the soldering operation and which has no deleterious effect on the skin. This fluxing agent may be prepared by treating any of a number of oils, resins and waxes with a halide of tin, arsenic or antimony. The halide apparently reacts with parts of the organic materials to form addition compounds composed of the inorganic salt and the organic constituent. It has been found that the halides in which the metals are combined in the higher-valent forms are suitable whereas salts containing the metals in their lower-valent form are unsatisfactory. The bi-valent chloride of tin has occasionally been used in water solutions as a flux. The flux made in accordance with this invention is insoluble in water but may contain various compatible organic materials in various proportions as fully described hereinafter.

Although, as I have indicated, any halide of the arsenic-antimony-tin group in the higher valences may be used in the preparation of a satisfactory flux within the scope of my invention, the first two members of this group are less satisfactory than tin, since their salts are more costly, they are too active and some of them are poisonous. Stannic chloride is preferably used, and for purposes of description and example, I shall treat of it in particular in the following detailed disclosure.

When a higher organic acid, such as abietic acid, is treated with stannic chloride a brownish precipitate is formed. This precipitate, which exhibits excellent fluxing properties, appears to be an addition product of the organic acid and stannic chloride. The components are sufficiently bound together to resist at ordinary temperatures replacement of the tin by zinc when it is used as a flux in soldering this metal. Thus no zinc chloride is formed to corrode the metallic parts. Unlike the free stannic chloride from which the flux is made, the organic addition product is not corrosive at ordinary temperatures, and residual flux remaining on the metal after soldering does not cause damage.

In preparing a flux for any particular soldering operation, the selection of organic materials to be used with the stannic chloride depends upon the nature of the metals to be joined by soldering, convenience in applying the flux, foreign materials which the flux must remove, and a number of other conditions which may be encountered in any particular case. In general, fluxes prepared in accordance with the present invention are suitable for soldering zinc, copper, brass, iron and other materials that can ordinarily be soldered, and may be used with soft solder of any composition. The scope of organic materials that may be used in the flux is very broad, a large number of natural oils, fats, waxes and resins having been found to react with stannic chloride as described above. This group may be referred to as the flux base material. It includes, for example, rosin, carnauba wax, tallow, linseed oil, cottonseed oil, pine oil and a number of other materials which contain the higher acids, esters, amides, aldehydes, ketones, and alcohols. An excess of any of these materials or other suitable inert material or solvent may be used as a plasticizer in obtaining a convenient body. It may sometimes be desirable to incorporate suitable solvents into the flux to aid in the cleaning of the parts to be soldered.

The following compositions have been found to produce satisfactory fluxes, all quantities being indicated by weight:

1. For a liquid flux, 24.5 parts of melted gum rosin are treated with 2 parts of anhydrous stannic chloride and this mixture dissolved in 73.5 parts of alcohol.

2. For a flux that will dissolve sealing wax when present in fairly thin layers, 18.1 parts of melted stearic acid are treated with 3.7 parts of anhydrous stannic chloride and this mixture is dissolved in 78.2 parts of acetone.

3. For a thin paste flux, 64.5 parts of cottonseed oil are treated with 5.5 parts of anhydrous stannic chloride and after cooling 30 parts of stearic acid is triturated with the mixture.

4. For a solid flux to be used in the form of a stick and applied by marking as with a crayon, 59.6 parts of first run rosin oil, 5.4 parts of candelilla wax, 5.4 parts of carnauba wax, 7.4 parts of paraffin, and 14.8 parts of amber petrolatum are mixed hot and 7.4 parts of anhydrous stannic chloride added, the mass being then poured into molds.

By proper selection of ingredients, the flux may also take the form of a lacquer-like liquid to be painted on the parts or coated on ribbon solder. Alcohol, acetone or benzol may be used as a solvent and a small amount of synthetic resin may be added to produce a tough film that can be soldered through by using a hot iron. After the solvent evaporates the flux forms a varnish-like coating. Powdered solder may be mixed with a paste flux to provide a complete soldering mixture. The novel compositions of my invention may be adapted for convenient application in any particular soldering operation by properly choosing solvents and carriers, whether the soldering is done by hand or by means of a soldering machine.

It will be seen that by means of the present invention there have been provided novel soldering flux compositions having properties superior to those heretofore available and which may be economically and easily prepared and used. A flux prepared in accordance with my invention is quick acting at soldering temperatures and non-corrosive at ordinary temperatures. Since a number of changes may be made in the above mentioned products and different embodiments of the invention may be made without departing from the scope of the invention, it is intended that all matters contained in the above description and specific examples should be interpreted as illustrative and not in a limited sense.

I claim:

1. A soldering flux comprising an addition compound of a halide of a metal of the arsenic-antimony-tin group in higher-valent form and an organic base material.

2. A soldering flux comprising the product of a halide of a metal of the arsenic-antimony-tin group in higher-valent form and a material selected from the group consisting of the higher aliphatic acids, their homologues and esters.

3. A composition useful as a soldering flux comprising the product of a halide of a metal of the arsenic-antimony-tin group in higher-valent form and a material selected from the group consisting of the higher aliphatic acids, their homologues and esters, and a plasticizing mixture comprising solvents and inert materials.

4. A soldering flux comprising the product of stannic chloride and a material selected from the group consisting of the higher aliphatic acids, their homologues and esters.

5. A soldering flux comprising stannic chloride and resin.

6. A soldering flux comprising stannic chloride and an ester of an alcohol.

7. A soldering flux comprising 3 to 20% stannic chloride and an organic base material.

8. A soldering flux comprising an anhydrous reaction product of stannic chloride and a higher fatty acid.

9. The process of making a flux of the character described comprising the steps of intermixing a hot organic base material with a halide of a metal of the tin-arsenic-antimony group in higher-valent form.

10. The process of making a flux of the character described comprising the steps of intermixing a hot fatty acid with stannic chloride.

11. The soldering flux of claim 4 dissolved in an organic solvent.

12. The soldering flux of claim 5 dissolved in an organic solvent.

13. The soldering flux of claim 6 dissolved in an organic solvent.

14. A soldering compound comprising powdered solder and the composition of claim 2.

HERBERT E. LAWSON.

---

CERTIFICATE OF CORRECTION.

Patent No. 2,090,846.                               August 24, 1937.

HERBERT E. LAWSON.

It is hereby certified that error appears in the printed specification of the above numbered patent requiring correction as follows: Page 2, second column, line 30, claim 5, before "resin" insert "a"; and that the said Letters Patent should be read with this correction therein that the same may conform to the record of the case in the Patent Office.

Signed and sealed this 5th day of October, A. D. 1937.

Henry Van Arsdale (Seal)                                    Acting Commissioner of Patents.

acids, esters, amides, aldehydes, ketones, and alcohols. An excess of any of these materials or other suitable inert material or solvent may be used as a plasticizer in obtaining a convenient body. It may sometimes be desirable to incorporate suitable solvents into the flux to aid in the cleaning of the parts to be soldered.

The following compositions have been found to produce satisfactory fluxes, all quantities being indicated by weight:

1. For a liquid flux, 24.5 parts of melted gum rosin are treated with 2 parts of anhydrous stannic chloride and this mixture dissolved in 73.5 parts of alcohol.

2. For a flux that will dissolve sealing wax when present in fairly thin layers, 18.1 parts of melted stearic acid are treated with 3.7 parts of anhydrous stannic chloride and this mixture is dissolved in 78.2 parts of acetone.

3. For a thin paste flux, 64.5 parts of cottonseed oil are treated with 5.5 parts of anhydrous stannic chloride and after cooling 30 parts of stearic acid is triturated with the mixture.

4. For a solid flux to be used in the form of a stick and applied by marking as with a crayon, 59.6 parts of first run rosin oil, 5.4 parts of candelilla wax, 5.4 parts of carnauba wax, 7.4 parts of paraffin, and 14.8 parts of amber petrolatum are mixed hot and 7.4 parts of anhydrous stannic chloride added, the mass being then poured into molds.

By proper selection of ingredients, the flux may also take the form of a lacquer-like liquid to be painted on the parts or coated on ribbon solder. Alcohol, acetone or benzol may be used as a solvent and a small amount of synthetic resin may be added to produce a tough film that can be soldered through by using a hot iron. After the solvent evaporates the flux forms a varnish-like coating. Powdered solder may be mixed with a paste flux to provide a complete soldering mixture. The novel compositions of my invention may be adapted for convenient application in any particular soldering operation by properly choosing solvents and carriers, whether the soldering is done by hand or by means of a soldering machine.

It will be seen that by means of the present invention there have been provided novel soldering flux compositions having properties superior to those heretofore available and which may be economically and easily prepared and used. A flux prepared in accordance with my invention is quick acting at soldering temperatures and non-corrosive at ordinary temperatures. Since a number of changes may be made in the above mentioned products and different embodiments of the invention may be made without departing from the scope of the invention, it is intended that all matters contained in the above description and specific examples should be interpreted as illustrative and not in a limited sense.

I claim:

1. A soldering flux comprising an addition compound of a halide of a metal of the arsenic-antimony-tin group in higher-valent form and an organic base material.

2. A soldering flux comprising the product of a halide of a metal of the arsenic-antimony-tin group in higher-valent form and a material selected from the group consisting of the higher aliphatic acids, their homologues and esters.

3. A composition useful as a soldering flux comprising the product of a halide of a metal of the arsenic-antimony-tin group in higher-valent form and a material selected from the group consisting of the higher aliphatic acids, their homologues and esters, and a plasticizing mixture comprising solvents and inert materials.

4. A soldering flux comprising the product of stannic chloride and a material selected from the group consisting of the higher aliphatic acids, their homologues and esters.

5. A soldering flux comprising stannic chloride and resin.

6. A soldering flux comprising stannic chloride and an ester of an alcohol.

7. A soldering flux comprising 3 to 20% stannic chloride and an organic base material.

8. A soldering flux comprising an anhydrous reaction product of stannic chloride and a higher fatty acid.

9. The process of making a flux of the character described comprising the steps of intermixing a hot organic base material with a halide of a metal of the tin-arsenic-antimony group in higher-valent form.

10. The process of making a flux of the character described comprising the steps of intermixing a hot fatty acid with stannic chloride.

11. The soldering flux of claim 4 dissolved in an organic solvent.

12. The soldering flux of claim 5 dissolved in an organic solvent.

13. The soldering flux of claim 6 dissolved in an organic solvent.

14. A soldering compound comprising powdered solder and the composition of claim 2.

HERBERT E. LAWSON.

---

CERTIFICATE OF CORRECTION.

Patent No. 2,090,846.           August 24, 1937.

HERBERT E. LAWSON.

It is hereby certified that error appears in the printed specification of the above numbered patent requiring correction as follows: Page 2, second column, line 30, claim 5, before "resin" insert "a"; and that the said Letters Patent should be read with this correction therein that the same may conform to the record of the case in the Patent Office.

Signed and sealed this 5th day of October, A. D. 1937.

Henry Van Arsdale (Seal)                                          Acting Commissioner of Patents.

CERTIFICATE OF CORRECTION.

Patent No. 2,090,846.  August 24, 1937.

HERBERT E. LAWSON.

It is hereby certified that error appears in the printed specification of the above numbered patent requiring correction as follows: Page 2, second column, line 30, claim 5, before "resin" insert "a"; and that the said Letters Patent should be read with this correction therein that the same may conform to the record of the case in the Patent Office.

Signed and sealed this 5th day of October, A. D. 1937.

Henry Van Arsdale (Seal) Acting Commissioner of Patents.